Aug. 8, 1961

R. A. BRADEN 2,995,742

RADAR SYSTEM SHOWING TARGETS IN ALTITUDE LAYERS

Filed March 25, 1948

2 Sheets-Sheet 2

Inventor
Rene A. Braden
By
J. L. Whittaker
Attorney

2,995,742
RADAR SYSTEM SHOWING TARGETS IN ALTITUDE LAYERS

Rene A. Braden, Hopewell, N.J., assignor to Radio Corporation of America, a corporation of Delaware
Filed Mar. 25, 1948, Ser. No. 16,920
3 Claims. (Cl. 343—11)

This invention relates to improvements in radar systems, more particularly ground-based search or surveillance radar systems as used for detecting the presence and indicating the positions of aircraft.

The principal object of the present invention is to provide methods and means for indicating the approximate altitudes, as well as the distances and directions of aircraft or other objects detected by radar.

More specifically, it is an object of this invention to provide a radar system including a plurality of visual position indicators, each assigned to a certain respective altitude layer, and means controlling said indicators so that each shows only the positions of reflecting objects or aircraft which are within the particular layer assigned to that indicator.

Figure 1:
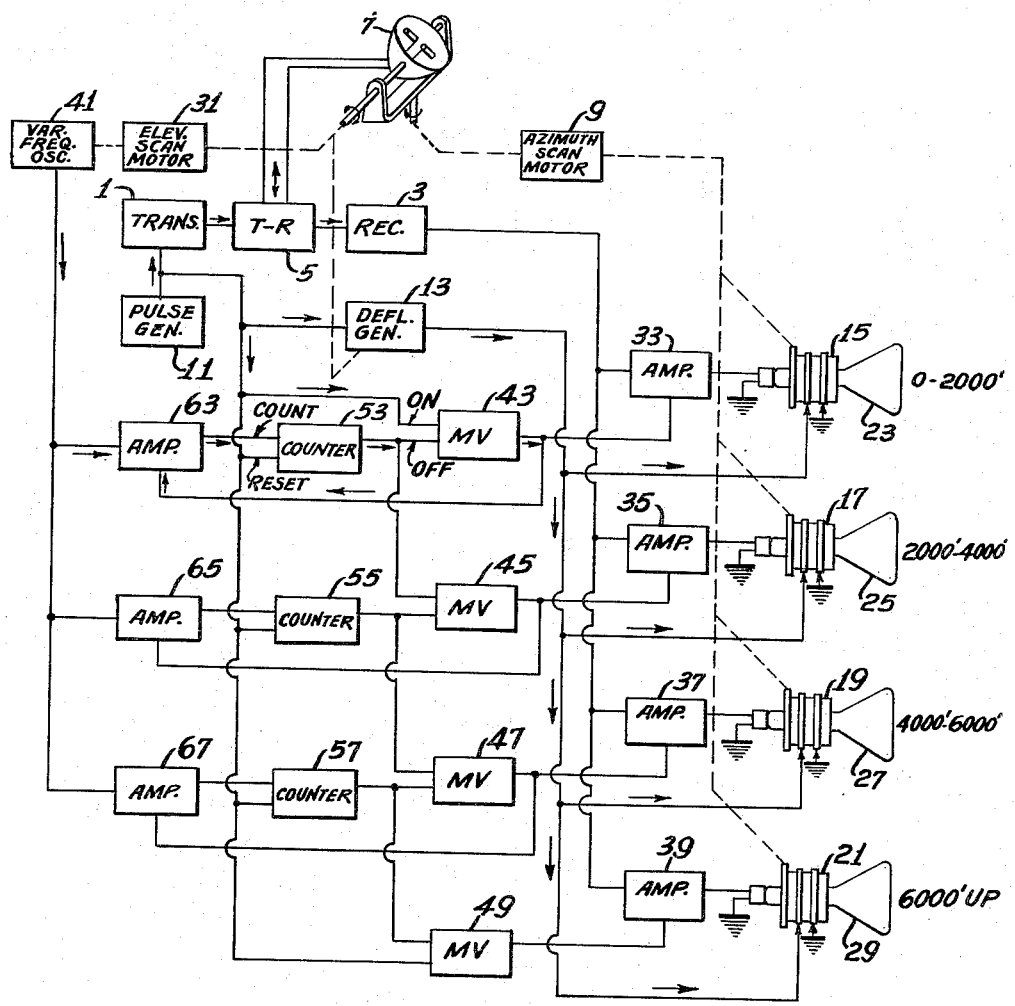
Figure 2:
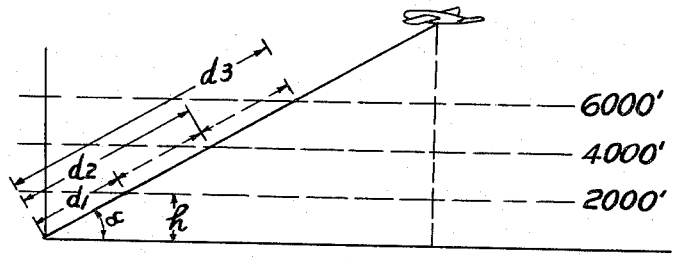
Figure 3:
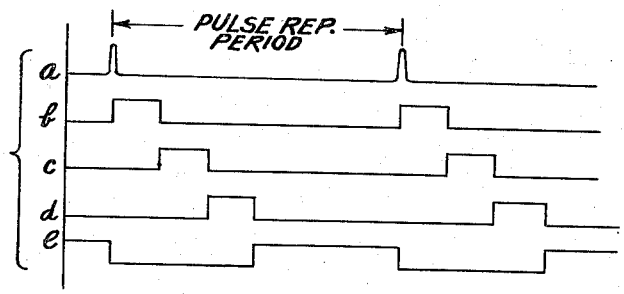
Figure 4:
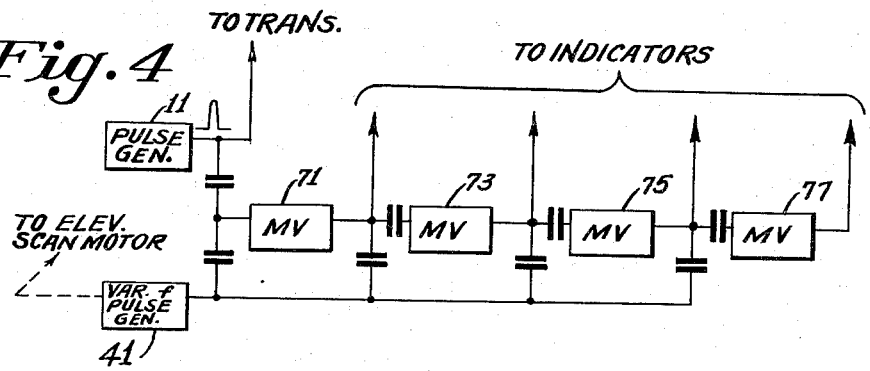

The invention will be described with reference to the accompanying drawings, wherein:

FIGURE 1 is a schematic block diagram of a radar system embodying one form of the present invention, FIGURE 2 is a geometrical diagram showing the relationship between altitude, distance, and elevation angle of an aircraft with respect to a ground station, FIGURE 3 is a group of oscillograms showing various signals produced in the operation of the system of FIGURE 1, and their time relationships, and FIGURE 4 is a schematic block diagram of a modification of the indicator switching system of FIGURE 1.

The radar system shown in FIGURE 1 is similar in some respects to prior art systems of the so-called "P.P.I." or plan position indicator, type. It includes a transmitter 1 and a receiver 3, both coupled through a duplexing device or "T-R box" 5 to a directive antenna 7. The antenna is rotated continuously in azimuth by a motor 9. A pulse generator 11 modulates the transmitter 1 and also controls a deflection signal generator 13 for energizing rotatable deflection yokes 15, 17, 19 and 21 on cathode ray oscilloscope tubes 23, 25, 27 and 29 respectively. The deflection yokes are rotated in synchronism with the rotation of the antenna 7 by the motor 9.

In addition to being rotated in azimuth, the antenna 7 is rocked cyclically in elevation by a motor 31. The motor 31 may be arranged to move the antenna 7 between elevation angles of zero and 90 degrees, at a rate which is slow with respect to the motion in azimuth, so that the beam of the antenna 7 moves spirally to scan the hemisphere. As an alternative, the scanning in elevation may be made much more rapid than that in azimuth, to periodically cover the hemisphere or any other desired solid angle. It should be apparent also that separate antennas may be used for transmission and reception, instead of the single antenna 7. In this case, the antennas may provide fan shaped beams, one wide in azimuth and the other wide in elevation. The directive axis of the former will then be rocked up and down by the motor 31, and the axis of the latter swept in azimuth by the motor 9. Since the various methods of radar scanning to cover a solid angle are well known to those skilled in the art, detailed description thereof is not necessary to a clear explanation of the present invention.

The output of the receiver 3 is applied to amplifiers 33, 35, 37 and 39, which are connected to the beam intensity control electrodes of the cathode ray tubes 23, 25, 27 and 29, respectively. Both the amplifiers and the intensity control electrodes are normally biased to cutoff, and thus no illuminated spot or trace is produced on the screen of any of the indicator tubes unless the bias on the respective amplifier is removed or overcome and at the same time a signal is received by the receiver 3. When this occurs, the received signal reaches the intensity control electrode and overcomes the bias thereon, momentarily intensifying or turning on the cathode ray beam to produce a luminous spot on the screen.

Means for controlling the amplifiers 33, 35, 37 and 39 include multivibrator or "flip flop" circuits 43, 45, 47 and 49. Said circuits may be of the Eccles-Jordan type, or any other known circuit which exhibits two stable conditions, with the property of being tripped or thrown from one state to the other by application of control voltage pulses to appropriate points. The circuit 43, for example, has two input points, one designated "on" and the other designated "off." When a positive voltage is applied to the "on" point, the potential at another point in the circuit increases in the positive direction to a certain value, where it remains until a pulse is applied to the "off" point.

A pulse at the "off" point throws the circuit 43 to its first stable position, and the potential at the output point decreases to its original lower value, where it remains until another signal is applied to the "on" point. The output point of the circuit 43 is connected to the amplifier 33 so as to overcome the cutoff bias thereon when the circuit 43 is in its "on" condition. The circuits 45, 47 and 49 are similar to the circuit 43, and are similarly connected to the respective amplifiers 35, 37 and 39.

The "on" point of the multivibrator 43 is connected to the pulse generator 11. The "off" point is connected to a counter circuit 53, which may be of the type described in co-pending U.S. patent application, Serial No. 666,472, filed May 1, 1946, by Igor E. Grosdoff, and entitled, Electronic Time Measuring Device, or any other known circuit which may be set up to provide a single output pulse in response to a train of a predetermined number of input pulses. In effect, the counter 53 is used merely as a frequency divider, but is a somewhat unusual frequency divider in that it will operate throughout a wide range of input frequencies, and preferably though not necessarily may have its frequency division ratio (i.e. the number of counts required to produce an output pulse) readily adjustable.

Assuming that the counter 53 is of the above-mentioned Grosdoff or a similar type, it has two input circuits designated respectively in the drawing as "count" and "reset." The pulses to be counted are applied to the "count" input, and a pulse applied to the "reset" input will return the counter circuit back to its initial or "zero" condition in preparation for again counting a predetermined number of input pulses applied to the "count" input.

The "count" input of the counter 53 is connected to an amplifier 63 which, like the amplifier 33, is normally biased to cutoff, but is connected to the multivibrator 43 so as to operate when the multivibrator is "on." The input circuit of the amplifier 63 is connected to an oscillator 41. The oscillator 41 may be designed to provide a narrow pulse wave form, or may produce some other wave form such as a sine wave. In the latter case, the amplifier 63 includes a wave shaping circuit for converting the output of the oscillator 41 to pulses. The "reset" terminal of the counter 53 is connected to the pulse generator 11.

The second multivibrator 45 is connected like the multivibrator 43 to a counter 55 and an amplifier 65, similar to the counter 53 and the amplifier 63, respectively. The "on" point of the multivibrator 45 is connected to the output of the counter 53, so that a pulse from the counter 53 turns on the multivibrator 45 at the same time that it turns off the multivibrator 43. The counter 55 may be designed or adjusted to respond to the same number of counts as the counter 53, or to a different number. The multivibrator 47 is likewise connected to a counter 57 and an amplifier 67. The "on" terminal of the multivibrator 47 is connected to the counter 55. The last multivibrator 49 has its "on" terminal connected to the output of the amplifier 57 and its "off" terminal connected to the pulse generator 11. The amplifiers 65 and 67 are connected like the amplifier 63 to the variable frequency oscillator 41.

In the operation of the described system, each pulse from the pulse generator 11 modulates the transmitter 1 and a corresponding pulse or burst of radio frequency energy is radiated by the antenna 7 in a sharp beam. Any reflecting object, such as an airplane which intercepts the beam, reflects some of the energy back to the antenna, causing the receiver 3 to produce an output pulse similar to the transmitted pulse, but delayed with respect thereto, by the interval required for the energy to travel from the radar station to the reflecting object and back. Coincidentally with the transmission of each pulse, the deflection generator 13 starts to energize the deflection yokes 15, 17, 19 and 21, moving the cathode ray beams in the respective indicator tubes radially in a direction corresponding to the current position in azimuth of the antenna 7. Each pulse from the generator 11 also resets the counters 53, 55 and 57 and turns on the multivibrator 43. This renders both amplifiers 33 and 63 operative. The counter 53 starts to count, and the multivibrator 43 remains on until a predetermined number of cycles have been produced by the oscillator 41. During this period any signals received by the receiver 3 are applied only to the cathode ray tube 23, because the multivibrators 45, 47 and 49 and their associated amplifiers are "off."

When the oscillator 41 has provided a predetermined number of cycles, the counter 53 produces a single pulse which turns off the multivibrator 43 and simultaneously turns on the multivibrator 45. The amplifiers 33 and 63 are cut off and the amplifiers 35 and 65 are made operative. Thus, any signal received at this time is applied only to the indicator tube 25. After an interval determined by the frequency of the oscillator 41 and the adjustment of the counter 55, the multivibrator 45 is turned off and the multivibrator 47 is turned on. The above-described sequence of events is repeated, enabling the indicator 27 for a predetermined period.

When the counter 57 turns off the multivibrator 47 and turns on the multivibrator 49, the amplifier 39 operates to apply any received signals to the last indicator tube 29. This condition persists during the remainder of the pulse repetition period of the pulse generator 11, until the next pulse is generated. Said pulse turns off the multivibrator 49, resets the counters, starts another cycle of the deflection generator 13, and turns on the first multivibrator 43.

It will be seen that the above-described cycle of events is repeated, starting with each pulse from the generator 11. The indicators 23, 25 and 27 operate in sequence during periods which may or may not be of equal lengths, but whose lengths are accurately controlled by the frequency of the oscillator 41. As the antenna 7 is moved to scan in elevation, the frequency of the oscillator 41 is varied from a relatively low value when the elevation angle is low and to a relatively high value when the elevation angle is high. The oscillator 41 and its mechanical connection to the motor 31 are designed so as to make the frequency of the oscillator vary according to the sine of the elevation angle $\alpha$ of the antenna 7.

Suppose, for example, that the indicator 23 is to show only those aircraft flying at altitudes of from zero to 2,000 feet, the indicator 25 is to show aircraft between 2,000 and 4,000 feet, the indicator 27 is to show aircraft between 4,000 and 6,000 feet, and the indicator 29 is to shown only aircraft above 6,000 feet. Referring to FIGURE 2, when the radar beam is at an elevation $\alpha$, all aircraft within the range $d_1$ are obviously within the zero to 2,000-foot layer. Simultaneously, all aircraft at a distance of greater than $d_1$ and less than $d_2$ are within the 2,000 to 4,000-foot altitude layer, and aircraft lying at distances greater than $d_2$ and less than $d_3$ are in the 4,000 to 6,000-foot layer. All aircraft at distances greater than $d_3$ are necessarily higher than 6,000 feet. Since $h$ equals $d \sin \alpha$, where $h$ is the altitude, any aircraft can be classified as to its altitude layer, providing its distance and elevation angle are known.

Referring to FIGURE 3, the oscillogram (a) represents the pulses produced by the generator 11 at a repetition frequency of for example, 5,000 pulses per second. The pulse repetition period is thus 200 microseconds. At some particular elevation angle, such as 30°, all aircraft within 4,000-foot distance from the radar station will be within the zero to 2,000-foot altitude layer. Accordingly, the indicator 23 should be operative during the period required for radiation to travel a total of 8,000 feet, or about 8 microseconds. Similarly, the indicator 25 should operate during the next following eight microsecond period, and the indicator 27 should operate during the next subsequent eight micro-second period. The indicator 29 is then left on until the following pulse is produced by the generator 11.

At any other elevation angle $\alpha_1$, the periods of operation of the respective indicators 23, 25, and 27 as shown in FIGURES $3_b$, $3_c$ and $3_d$ respectively, should be proportional to $1/\sin \alpha$. This timing is provided by varying the frequency of the oscillator 41 as described above in proportion to sine $\alpha$, since the length of time required by each of the counters to count $n$ cycles is inversely proportional to the oscillator frequency. It will be apparent without further illustration that a larger or smaller number of altitude layers may be used with a corresponding number of indicators. Moreover, the thicknesses of various layers need not be equal; the various counters may be designed or adjusted to respond to different numbers of cycles from the oscillator 41. In order to make the displays on the cathode ray tubes show horizontal distances, rather than slant distances, it is desirable to vary the radial scanning rates of the cathode ray beams in proportion to the cosine of the elevation angle $\alpha$. This can be accomplished by controlling the amplitude of the deflection generator 13 by the elevation scanning motor 31.

Various modifications of the described system may be made within the scope of the invention. For example, the altitude layers depicted by the various indicators may be made to overlap by providing additional counters to turn on each indicator some time before the previous indicator is turned off. The amplifiers 33, 35, 37 and 39 may be omitted, and the outputs of the respective multivibrators used merely to overcome the cut-off bias on the intensity control electrodes of the respective indicator tubes.

Various systems other than that of FIGURE 1 may be used to make the several indicators operate successively throughout periods which bear the same ratio to each other but vary in length according to the elevation of the radar beam.

Referring to FIGURE 4, a plurality of multivibrators 71, 73, 75 and 77, each similar to the multivibrator 43 of FIGURE 1, are connected in cascade in known manner so that only one at a time is "on," the remaining multivibrators being "off." Multivibrator chains of this type are described on pages 439 and 440 of the September 1946 issue of the RCA Review in an article entitled, "Electronic Counters," by I. E. Grosdoff. The variable frequency oscillator 41 is connected in parallel to all of the multivibrators so that each cycle of its output will shift the "on" condition from the multivibrator which is currently "on" to the next multivibrator in the chain. This sequence will continue until the last multivibrator 75 is turned on. The next subsequent cycle of the generator 41 will turn off the multivibrator 75, but the first multivibrator 71 will also remain off until the next pulse from the pulse generator 11 occurs. The pulse generator 11 restarts the cycle by turning on the multivibrator 71. The outputs of the various multivibrators are applied to the corresponding indicators, as in the system of FIGURE 1, so that each indicator is operated in succession during a period whose length is determined by the frequency of the oscillator 41. It will be apparent that the depths or thicknesses of all the altitude layers except the last will be equal with this arrangement, because each cycle of the oscillator 41 switches the system from one indicator to the next. The operation of the system may be otherwise identical with that described in connection with FIGURE 1.

The invention has been described as an improved radar system which scans both in azimuth and in elevation to cover a solid angle or a complete hemisphere, detecting all aircraft or other reflecting targets within range, and automatically classifies all reflections according to the altitude from which they originate, switching the received signals into different channels corresponding to established altitude layers. Each channel is provided with a separate indicator which shows only those aircraft lying within the respective altitude layer.

I claim as my invention:

1. Radio locator apparatus comprising a surface station, means for transmitting pulse-modulated signals from the station into a service zone to scan it in depth, means for receiving re-radiations of said signals from objects within said zone, an antenna system the pattern of which is narrow at least in its vertical dimension for establishing a directive axis for this system, means for controlling the antenna system to vary the angle of elevation of said directive axis further to scan said service zone, indicator means including a plurality of cathode ray tubes, coupling means from said receiver means to the indicator means, a circuit arrangement for controlling the response of the indicator means when re-radiations are received from said objects to visually represent on the screen of each tube any of said objects which are positioned in a different altitude layer predetermined to correspond thereto, said circuit arrangement including time-measuring means effective after the transmission of a signal pulse to measure substantially in sequence a predetermined number of time intervals which occur within the period between that pulse and the next one and to produce control voltages corresponding to said intervals, means for controlling the time-measuring means so that said intervals for any period will be measured to have particular durations in accordance with the angle of elevation of said axis during said period, means responsive to the control voltages to control the response of the indicator means to output from the receiver means selectively to actuate each of said tubes therewith during a different respective interval whereby re-radiations from an object in any of said altitude layers will produce a representation of that object on the screen of the particular tube corresponding to that layer.

2. Radio locator apparatus as in claim 1 in which said time-measuring means comprises an oscillator operable over a range of frequencies all of which are much higher than the rate of pulse modulation of said transmitted signals, means coupled to said means controlling the antenna to determine the operating frequency of the oscillator in accordance with the angle of elevation of said axis, and for each cathode ray tube a counter means for responding to a predetermined number of cycles of the output of said oscillator to measure one of said time intervals.

3. Radio locator apparatus as in claim 1 in which the pattern of said antenna system is also narrow in its horizontal dimension, said radio locator apparatus further includes means for controlling the antenna system to vary the azimuth angle of said directive axis, said indicator means comprises for each of the tubes a deflection means for deflecting the ray thereof radially from a central point on its screen in synchronism with the pulse modulations of said transmitted signals so as to produce a range scale on said screen and means for further deflecting the ray to rotate said range scale about said central point in synchronism with the variations of the azimuth angle, whereby re-radiations from an object in one of said altitude layers, in addition to producing a representation of that object on the screen of a particular cathode ray tube corresponding to that layer, will produce that representation at a particular place on said screen to indicate azimuth and distance information as to the position of that object in said zone.

References Cited in the file of this patent

UNITED STATES PATENTS

| | | |
|---|---|---|
| 2,403,527 | Hershberger | July 9, 1946 |
| 2,405,238 | Seeley | Aug. 6, 1946 |
| 2,412,669 | Bedford | Dec. 17, 1946 |
| 2,412,670 | Epstein | Dec. 17, 1946 |
| 2,428,351 | Ayrs | Oct. 7, 1947 |
| 2,437,286 | Wilt | Mar. 9, 1948 |